Feb. 13, 1962 W. P. VAN DEN BLINK ET AL 3,021,418
STUD-WELDING FERRULE
Filed June 6, 1958

INVENTORS
WILLEM PIETER VAN DEN BLINK
KAREL CHRISTIAAN TER HAAR
EELKE HERMAN ETTEMA
BY
AGENT

United States Patent Office 3,021,418
Patented Feb. 13, 1962

3,021,418
STUD-WELDING FERRULE
Willem Pieter van den Blink, Karel Christiaan ter Haar, and Eelke Herman Ettema, all of Utrecht, Netherlands, assignors to North American Philips Company, Inc., New York, N.Y., a corporation of Delaware
Filed June 6, 1958, Ser. No. 740,438
Claims priority, application Netherlands June 12, 1957
4 Claims. (Cl. 219—99)

Claims directed to the device are being presented in our co-pending divisional application Serial No. 151,118 filed October 5, 1961.

The invention relates to a method of fastening one end of a bolt, a stud or the like by electric arc welding to a metal work piece with the aid of an annular, slag-building body which is arranged, at the beginning of the welding operation, about one end of the bolt or the like.

The invention relates furthermore to a welding bolt or welding stud, a slag-building body and a device for carrying out the said method.

It has been found that, in order to obtain satisfactory welding results, it is very important to hold the slag-building body well centered with respect to the bolt or stud to be fastened by welding.

In accordance with the invention the body is held by a more or less pinching fit between the inner wall of the body proper and the side surface of the bolt, stud or the like, on the said surface prior to the welding operation.

Thus the body can be held on the bolt or stud in a satisfactorily centered position without the need for use of particular members, for example cardboard cylinders on the body itself. Therefore, reference is made here to the inner wall of the body "proper."

The desired pinching fit may be obtained in various ways. When the welding bolt or stud is provided with a shoulder, against which the body can butt, the side surface of the stud below this shoulder may be roughened or be provided with small extensions. The latter may, for example, be obtained by providing longitudinal grooves in this side surface. As an alternative, the bolt or stud may be provided with a truncated cone surface, on which the slag-building body fits pinchingly.

As a further alternative, the inner surface of the annular, slag-building body may have a conical fitting surface, for example at an angle of 5°. In an efficient embodiment of this feature the inner side of the ring may have two conical fitting surfaces in a manner such that the longitudinal section of the ring is substantially symmetrical. This construction is practical, since in this case the ring can be positioned with either of its ends on the bolt or stud. With these constructions the bolt or stud need not be provided with a shoulder.

A further possibility of obtaining a suitable fit between the slag-building, annular body and the stud or bolt consists in that to the inner surface of the ring a layer of metal or of other material is applied, for example by spraying. This is capable of bridging the tolerances.

It may, moreover, be desirable to hold somewhat more tightly the ring centered on the bolt or stud, particularly before it is positioned on the work piece. This applies especially when the ring fits detachable to the stud. This may be achieved by using a suitable construction of the welding gun or the like employed for welding the bolt or stud to the work piece. In accordance with the invention the gun or the like is provided with a member by which an annular, slag-building body can be held temporarily on a surface of the bolt or stud and which is moved away from the body or is detachable from this body, when this occupies its correct position relative to the work piece.

With a practical embodiment of this construction provision is made of a support which has an axially movable terminal, which has a preferably resilient extension adapted to urge an annular, slag-building body provided on a welding bolt or stud against the side surface of the bolt or stud, the said axially movable terminal being guided in a manner such, for example by means of an oblique slot and a stud, in the support, that the extension secured thereto, during the axially inward movement, performs at the same time a pivotal motion away from the annular body.

Embodiments of the invention will now be described with reference to the drawing.

Figure 1:
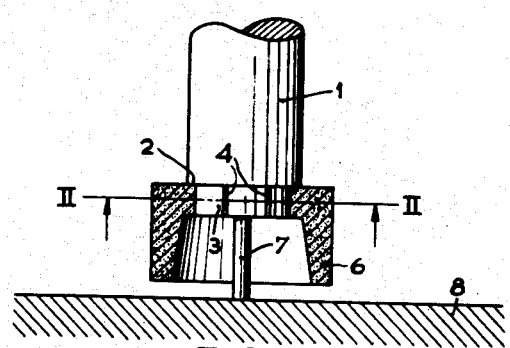
FIG. 1 is a view, partly a longitudinal sectional view of a welding stud, on which an annular, slag-building body is arranged in the manner according to the invention.

The welding stud 1 of FIG. 1 has a shoulder 2, below which lies a surface 3, which is cylindrical in this case and in which longitudinal grooves 4 are milled in a manner such that burrs 5 are formed; around this surface fits rather tightly an annular, slag-building body 6. From the end surface of the cylinder 3 protrudes a stud 7, which serves to initiate the arc between the stud 1 and the work piece 8.

Figure 6:
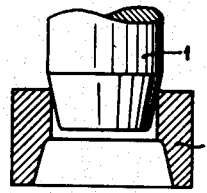
FIGS. 5 and 6 are longitudinal sectional views of further embodiments of the invention.
Figure 2:
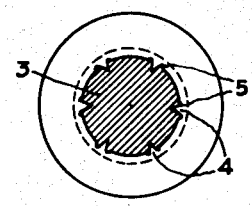
FIG. 2 is a sectional view taken on the line II—II of FIG. 1.
Figure 5:
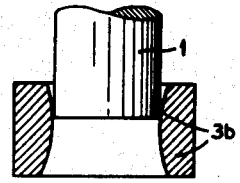

Under certain conditions the grooves 4 may be omitted. The cylindrical surface 3 may have the form of a truncated cone, as is shown in FIG. 6. Then the shoulder 2 may be omitted. As an alternative, the stud 1 may be a simple cylinder without shoulder (FIG. 5), the ring 6 having in this case at least one conical part on the inner surface. The use of two conical surfaces, as is shown in FIG. 5, is efficient, since, when arranging the ring 6, it is not necessary to observe which end is used.

Figure 3:
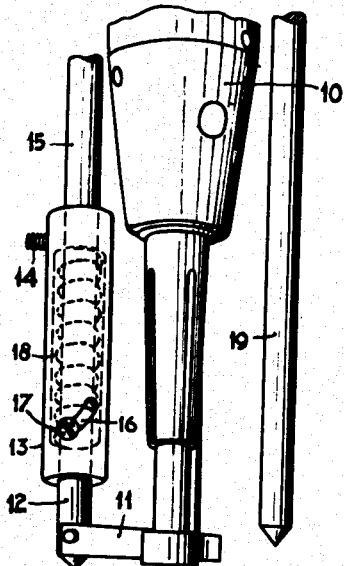
FIG. 3 is a perspective view of the lower part of a welding gun, provided with a device according to the invention.
Figure 4:
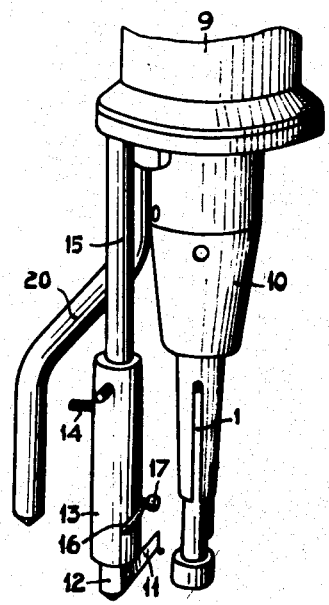
FIG. 4 shows the assembly of FIG. 3 under a different viewing angle.

In order to ensure, so to say temporarily, a detachable connection between the ring 6 and the cylinder 3, the device shown in FIGS. 3 and 4 may be used.

The gun 9 has a holder 10 for a welding stud 1, which may be constructed as shown in FIG. 1 and on which is arranged a ring 6 as shown in FIG. 1 so as to be detachable. This ring 6 is pressed tight temporarily on the cylinder 3 by a blade spring 11, which is secured to a pin 12, which protrudes from a support 13, which is adjustable in the direction of height relative to a rod 15 by means of a screw 14, this rod being secured to the gun 9.

The support 13 has an oblique slot 16. Through this slot projects a screw 17, which is secured in the pin 12. In the support 13 is provided a screw spring 18 (shown in dotted lines), which urges the pin 12 to the outside.

The gun has, furthermore, legs 19 and 20.

When the gun is placed with these legs on the work piece 8, the pin 12 is urged to the inner side along the guide slot 16 against the action of the spring 18. Then the blade spring 11 pivots away from the ring 6, which has then arrived at the correct position relative to the work piece and which needs no further holding. The pivotal motion of the spring is, moreover, important to protect the spring from burning during the welding operation.

What is claimed is:

1. A ferrule for use in stud welding comprising a body of slag-forming material provided with a bore having an intermediate cross-section less than, and end cross-sections greater than, the cross-section of the stud to be welded; and means for holding the ferrule to the stud with a pinching fit including the inner surface of the body between the intermediate section and one end section.

2. A ferrule for use in stud welding comprising a body of slag-forming material provided with a bore having a central cross-section less than, and end cross-sections greater than, the cross-section of the stud to be welded; and means for holding the ferrule at either end to the stud with a pinching fit including the inner surfaces of the body between the central section and the end sections.

3. A ferrule for use in stud welding comprising a body of slag-forming material provided with a bore having an intermediate cross-section less than, and end cross-sections greater than, the cross-section of the stud to be welded; the inner surfaces of the body between the intermediate section and end sections being of substantially conical shape and forming angles of about 5° with the axis of the bore; and means including said inner surfaces to hold the ferrule at either end to the stud with a pinching fit.

4. A ferrule for use in stud welding comprising an annular body of slag-forming material; the bore of the body having a central cross-section less than, and end cross-sections greater than, the cross-section of the stud to be welded; the inner surfaces of the body on each side of the central section being symmetrical and of conical shape with a slope of about 5° with the axis of the bore; and means including said inner surfaces to hold the ferrule at either end to the stud with a pinching fit.

References Cited in the file of this patent

UNITED STATES PATENTS

| | | |
|---|---|---|
| 1,527,797 | Harrison | Feb. 24, 1925 |
| 2,384,403 | Somers | Sept. 4, 1945 |
| 2,416,204 | Nelson | Feb. 18, 1947 |
| 2,416,915 | Evans | Mar. 4, 1947 |
| 2,422,265 | Squires | June 17, 1947 |
| 2,459,957 | Palmer | Jan. 25, 1949 |
| 2,462,882 | Martin | Mar. 1, 1949 |
| 2,493,283 | Evans | Jan. 3, 1950 |
| 2,510,000 | Willigen | May 30, 1950 |
| 2,643,319 | Willigen | June 23, 1953 |
| 2,745,933 | Puckett | May 15, 1956 |
| 2,775,685 | Webster | Dec. 25, 1956 |
| 2,829,234 | Van den Blink | Apr. 1, 1958 |